Figure 1:
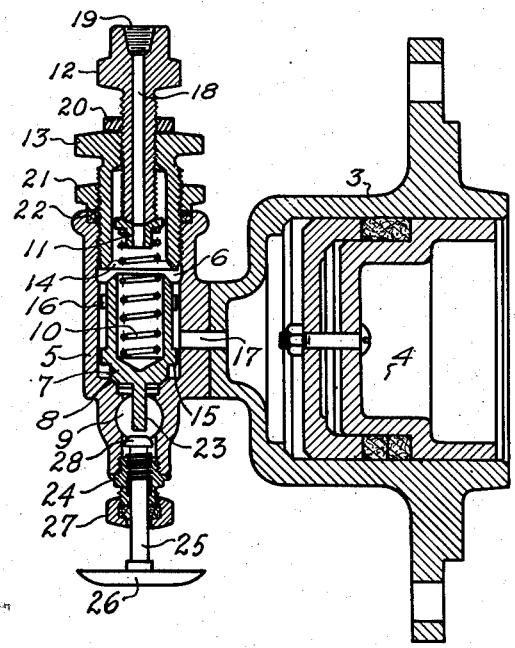

May 19, 1936.　　　S. B. REDFIELD　　　2,041,148

REGULATOR PILOT VALVE

Filed April 12, 1935

INVENTOR
S. B. REDFIELD
BY
ATTORNEY

Patented May 19, 1936

2,041,148

UNITED STATES PATENT OFFICE 2,041,148

REGULATOR PILOT VALVE

Snowden B. Redfield, Bethlehem, Pa., assignor to Fuller Company, Catasauqua, Pa., a corporation of Delaware Application April 12, 1935, Serial No. 15,976

8 Claims. (Cl. 251—141)

This invention relates to pilot valves for controlling the operation of regulators of compressors for air and other gases, and more particularly for controlling compressor unloading and reloading within predetermined limits of pressure.

It is especially concerned with a simple and positive means to unload the compressor manually and to conduct the residual gases resulting both from automatic and manual unloading, from the regulator and pilot valve to atmosphere or to the compressor intake to conserve the gases, rather than to vent them directly from the valve, a characteristic of manually unloadable valves of previous types. This feature is of especial utility in the handling of inflammable and noxious gases, as it avoids the discharge of residual gas into the compressor room without sacrificing the advantages of manual unloading. It is among the further purposes to provide a simplified arrangement of parts to insure accuracy in range between the pressure limits of unloading and reloading, and to prevent accidental unloading due to vibration of the manual unloading device.

In general, the new apparatus comprises a generally cylindrical valve chest within which an interior valve is arranged for longitudinal movement between oppositely disposed seats, one of which is smaller than the other. The seats are preferably of the beveled type, and the smaller may conveniently be cut into the chest itself. Beyond and preferably below the smaller seat, a gas supply inlet is provided which may be connected to the main receiver of the compressor. The interior valve is provided with a cylindrical chamber to receive a helical spring which normally tends to hold the valve against the smaller seat. The opposite end of the spring is carried by a retainer which freely abuts a threaded plug arranged concentrically within a hollow threaded plug which closes one end of the chest. The inner end of this plug is beveled to form the larger and movable seat for the interior valve. Between the seats, the chest is provided with a port to conduct gas to or from the regulator cylinder or other unloading apparatus of the compressor.

For discharging the residual gas from the unloading apparatus and pilot valve while the compressor is unloading, the spring retainer and its holding plug are provided with a central passage through which the gas may be vented. In order to conduct the gas either to atmosphere or to the intake side of the compressor system, this plug is provided with a threaded connection for a pipe of any suitable type. The pilot valve is adjustable to unload the compressor at a predetermined pressure by varying the position of the central plug and thereby the compression of the spring, and the range between limits of pressure for unloading and reloading by varying the longitudinal movement of the interior valve between the fixed and movable seats.

The apparatus will function in any position, but I prefer to invert the operating parts, as compared with the more conventional types of pilot valves, to prevent accidental mechanical unloading due to the effect of vibration on the manual unloading devices.

To provide for positive manual unloading, without venting the gas in the vicinity of the compressor, the primary purpose of the invention, the interior valve is preferably provided with a projection extending through the orifice of the smaller seat and into the gas supply inlet. The chest is bored and threaded to receive a support for a longitudinally movable stem to act against the valve projection to force the valve from its seat against the compression of the spring. This stem is preferably a spindle threaded in a bonnet carried by the valve chest, the bonnet preferably being provided with a packing gland to prevent leakage of gas around the spindle. The spindle may be actuated by a handwheel secured to the exterior end of the spindle. Unloading of the compressor is accomplished by screwing the spindle inwardly until the interior valve is seated on its larger seat, and conversely, reloading is accomplished by turning the wheel in the opposite direction whereby the valve again rests on its smaller seat. It will be understood that by inverting the operating parts as described above, any vibration of the apparatus will tend to maintain the spindle at its outermost position and thereby prevent accidental unloading.

Figure 2:
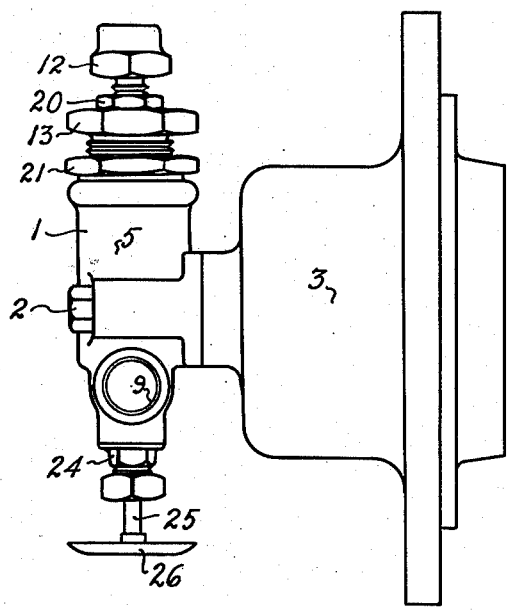

For a more complete understanding of the invention, reference is made to the accompanying drawing in which:

Fig. 1 is a sectional elevation of the apparatus with the parts in "loaded" position, and Fig. 2 is an elevation.

Referring to the drawing, the apparatus will be seen to comprise a pilot valve 1 secured, as by means of cap screws 2, to the unloading apparatus of a compressor indicated generally by the regulator cylinder 3 and piston 4. The valve chest 5 is provided with a central bore 6 including an enlarged central section to receive an interior valve 7. The lower end of the valve is suitably beveled for seating in a correspondingly beveled seat 8 which may be cut into the body of the chest. The chest is provided with an inlet 9 communicating with bore 6 below seat 8, for a connection to the receiver of the compressor.

The interior valve 7 is provided with a central bore to receive and guide a compression spring 10 which tends to hold the valve against seat 8. The opposite end of spring 10 is secured by a spring retainer 11 which freely abuts a longitudinally adjustable plug 12 externally threaded, centrally within a second externally threaded hollow plug 13. The plug 13 closes the chest 5 and its inner end is beveled at 14 to provide the larger and movable seat for the interior valve 7.

The valve 7 is provided with a lower continuous flange 15 the diameter of which is sufficiently smaller than that of the bore 6 to permit a limited flow of gas around it when the valve is lifted from its seat 8 due to supply pressure greater than the force exerted by the compression spring 10. Above the flange 15, a circular series of projections 16 are provided, which serve with the flange 15 to guide the longitudinal movement of the valve.

Between the seats 8 and 14 the chest 5 is provided with a port 17 which communicates with a corresponding port in the regulator cylinder 3, or equivalent apparatus, to supply a volume of gas under pressure to actuate the unloading apparatus represented by the piston 4.

When the compressor is reloaded, the residual gas is discharged as follows:

The piston 4 returns to the position shown and the gas passes through port 17 and between the projections 16 and a central passage 18 in the spring retainer 11 and plug 12. The outer end of plug 12 is preferably screw threaded as indicated at 19 to provide a connection to suitable piping (not shown) whereby the gas may be conducted to atmosphere or to the intake side of the compressor.

The valve may be adjusted to unload at a predetermined pressure by varying the longitudinal position of the plug 12 and securing it in such position by the jam nut 20 when the adjustment is correct. The range between the unloading and reloading pressures is controlled by adjusting the longitudinal position of the plug 13 which varies the location of the movable seat 14, increased pressure ranges being obtained by decreasing the travel of the valve 7. The plug 13 is preferably secured in position by a jam nut 21 and, to prevent leakage, I prefer to insert packing, such as a lead washer 22 arranged in a channel in the upper end of the chest, between it and the jam nut.

For manual unloading, I prefer to provide a positive means to force or lift the valve 7 from its seat 8. The valve is preferably provided with a dependent projection 23 extending beyond or below the seat 8. At its lower end, the central bore of the chest 5 is threaded to receive a bonnet 24 carrying a threaded stem or spindle 25, the outer end of which carries the handwheel 26, leakage around the spindle being prevented by means of a packing gland 27. The inner end of spindle 25 is preferably provided with an enlarged, rounded head 28 to act against the projection 23 when the spindle is screwed inwardly.

The operation of the apparatus will be generally understood from the foregoing description and it will be realized that prior to starting the compressor, the handwheel will be turned until the spindle forces the valve 7 against seat 14 whereby the compressor may be brought to its normal speed before the valve 7 is manually released and the compressor thereby loaded. When the supply pressure reaches the predetermined maximum, it raises valve 7 from seat 8, the added area of the flange 15 exposed to the supply pressure accelerating the movement of the valve to the seat 14. The gas flowing around flange 15 passes through port 17 and reacts against the piston 4 or equivalent apparatus to unload the compressor.

It will be realized from the foregoing description that instead of relying upon gravity and gas pressure, I have provided a positive, mechanical means to move the interior valve from the smaller seat, and that it is not necessary to enclose the apparatus and sacrifice the advantage of manual unloading when dangerous gases are handled.

I claim:

1. A regulator pilot valve for compressors comprising the combination of a valve chest having a central bore, oppositely disposed valve seats within the chest, one of the seats having a larger orifice than the other, an interior valve movable between the seats, a spring normally holding the valve against the smaller seat, the chest being provided with a gas supply inlet beyond the smaller seat, a discharge port between the seats and a vent beyond the larger seat, and manually operable means to force the interior valve from the smaller seat including a bonnet closing the bore of the chest beyond said seat, a spindle extending through the bonnet and provided with screw threads to permit its longitudinal movement therein, one end of the spindle extending into said supply inlet, so that inward movement of the spindle will cause it to act against the valve and force it from said seat.

2. A regulator pilot valve for compressors comprising the combination of a valve chest having a central bore, oppositely disposed valve seats within the chest, one of the seats having a larger orifice than the other, an interior valve movable between the seats, a spring normally holding the valve against the smaller seat, the chest being provided with a gas supply inlet beyond the smaller seat, the valve being movable from said seat by the effect of air pressure greater than the force of said spring, a discharge port between the seats and a vent beyond the larger seat, the interior valve having a projection extending through the orifice of the smaller seat and into the gas supply inlet, and manually operable means to force the valve from said seat including a spindle threaded for longitudinal movement within and closing the bore of the chest, the spindle extending into said supply inlet and being movable to act against the projection to force the valve from said seat.

3. A regulator pilot valve for compressors comprising the combination of chest, oppositely disposed valve seats within the chest, one of which has a larger orifice than the other, the chest being provided with a gas supply inlet beyond the smaller seat and a discharge port between said seats, an interior valve within the chest movable between the seats, means normally holding the valve against the smaller seat, manually operable mechanical means beyond said seat including a stem movable inwardly against the valve to force it from said seat against said holding means, a closure for the chest beyond the larger seat, the closure being provided with a gas passage terminating in a pipe connection for gases.

4. A regulator pilot valve for compressors comprising the combination of chest, oppositely disposed valve seats within the chest, one of which has a larger orifice than the other, the chest being provided with a gas supply inlet beyond the smaller seat and a discharge port between said seats, an interior valve within the chest movable between the seats, a helical spring normally holding the valve against the smaller seat, manually operable mechanical means beyond said seat including a stem movable inwardly against the valve to force it from said seat against the spring, a closure for the chest beyond the larger seat, a plug passing centrally through the closure and threaded for longitudinal adjustment therein, the inner end of the plug supporting an end of the spring and holding it under a predetermined compression, the plug being provided with a central gas passage communicating with the bore of the chest and a connection for a pipe at its exterior end.

5. A regulator pilot valve for compressors comprising the combination of chest, oppositely disposed valve seats within the chest, one of which has a larger orifice than the other, the chest being provided with a gas supply inlet beyond the smaller seat and a discharge port between said seats, an interior valve within the chest movable between the seats, a helical spring normally holding the valve against the smaller seat, manually operable mechanical means beyond said seat including a stem movable inwardly against the valve to force it from said seat against the spring, a hollow plug externally threaded for longitudinal adjustment in the bore of the chest and having an inner end forming the larger seat for the interior valve, the opposite end being closed to close the bore, a plug passing centrally through the hollow plug and threaded for longitudinal adjustment therein, the inner end of the plug supporting an end of the spring and holding it under a predetermined compression, the plug being provided with a central gas passage communicating with the bore of the chest and a connection for a pipe at its exterior end.

6. A regulator pilot valve for compressors comprising the combination of chest, oppositely disposed valve seats within the chest, one of which has a larger orifice than the other, the chest being provided with a gas supply inlet beyond the smaller seat and a discharge port between said seats, an interior valve within the chest movable between the seats, the valve being provided with a central chamber open at one end and closed at the end adjacent the smaller seat, a helical spring guided by the walls of the chamber, one end of the spring normally holding the valve against said seat, manually operable means beyond said seat including a stem movable inwardly against the valve to force it from said seat against the spring, a hollow plug externally threaded for longitudinal adjustment in the bore of the chest and having an inner end forming the larger seat for the interior valve, the opposite end being closed to close the bore, a plug passing centrally through the hollow plug and threaded for longitudinal adjustment therein, the inner end of said plug supporting and acting upon the other end of the spring to hold it under a predetermined compression, the plug being provided with a central gas passage communicating with the bore of the chest and a connection for a pipe at its exterior end.

7. A regulator pilot valve for compressors comprising the combination of a vertical chest, oppositely disposed valve seats within the chest, the upper seat having a larger orifice than the lower, the chest having a gas supply inlet below the lower seat and a discharge port between the seats, an interior valve within the chest movable between the seats, the valve being provided with a central chamber closed at its lower end and open at the other, a helical spring guided by the walls of the chamber, the lower end of the spring acting against the valve to hold it normally against the lower seat, manually operable means below said seat including a stem movable upwardly against the valve to raise it from its seat against the compression of the spring, a hollow plug externally threaded into the upper end of the chest for longitudinal adjustment therein, the lower end of the plug forming the upper seat for the valve, the upper end of the plug being closed, a plug passing centrally through the hollow plug and threaded for longitudinal adjustment therein, a retainer for the upper end of the spring freely abutting the lower end of the plug, the plug being provided with a central gas passage communicating with the chest and a connection for a vent pipe at its upper end.

8. A regulator pilot valve for compressors comprising the combination of a valve chest, oppositely disposed valve seats within the chest, one of the seats having a larger orifice than the other, an interior valve movable between the seats, a spring normally holding the valve against the smaller seat, the chest being provided with an inlet beyond the smaller seat for the admission of gas under pressure to actuate said valve, the valve being movable in opposition to said spring by the effect of the pressure of said gas exerted against the area of the smaller seat, the valve being retained against the larger seat opposed to the increased compression of the spring by the effect of said pressure exerted against the larger area, a discharge port between the seats and a vent beyond the larger seat, and means to move the interior valve from its smaller seat at a time when the gas exerts a pressure less than the force of the spring, including a stem extending into the chest and manually movable inwardly against the interior valve to force the latter from the smaller seat to the larger seat and to hold it against the larger seat in opposition to the force exerted by said spring.

SNOWDEN B. REDFIELD.